US008579199B2

(12) United States Patent
Sano

(10) Patent No.: US 8,579,199 B2
(45) Date of Patent: Nov. 12, 2013

(54) CODE SYMBOL READING APPARATUS AND READING METHOD

(75) Inventor: Masahito Sano, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 291 days.

(21) Appl. No.: 13/019,717

(22) Filed: Feb. 2, 2011

(65) Prior Publication Data

US 2011/0198399 A1 Aug. 18, 2011

(30) Foreign Application Priority Data

Feb. 15, 2010 (JP) ................................ 2010-030541

(51) Int. Cl.
*G06K 7/10* (2006.01)

(52) U.S. Cl.
USPC .......................................... 235/470; 235/454

(58) Field of Classification Search
USPC ................................................. 235/470, 454
See application file for complete search history.

(56) References Cited

U.S. PATENT DOCUMENTS

2007/0090190 A1* 4/2007 Kuromatsu et al. ........... 235/454
2009/0188981 A1 7/2009 Iizaka et al.
2009/0192909 A1 7/2009 Iizaka et al.
2009/0194593 A1 8/2009 Kurihara et al.
2011/0266339 A1* 11/2011 Yach ............................ 235/375

FOREIGN PATENT DOCUMENTS

| | | |
|---|---|---|
| JP | 2004-252897 | 9/2004 |
| JP | 2005266907 | 9/2005 |
| JP | 2006-344066 | 12/2006 |
| JP | 2007-207085 | 8/2007 |
| JP | 2009176036 | 8/2009 |
| JP | 2009-213751 | 9/2009 |

OTHER PUBLICATIONS

Japanese Office Action for Japanese Application No. 2010-030541 mailed on Jan. 10, 2012.

* cited by examiner

*Primary Examiner* — Allyson Trail
(74) *Attorney, Agent, or Firm* — Turocy & Watson, LLP

(57) ABSTRACT

According to one embodiment, a code symbol reading apparatus includes a decoder, a candidate area detection unit, a direction determination unit, and a direction notification unit. The decoder decodes a code symbol attached to an article, based on an image picked up by a camera. The candidate area detection unit detects an image area to be a candidate of the code symbol from the image of the article picked up by the camera. The direction determination unit determines such a direction that a decoding rate of the code symbol becomes higher based on the image area detected by the candidate area detection unit when the decoder cannot decode the code symbol. The direction notification unit notifies of the direction determined by the direction determination unit.

11 Claims, 7 Drawing Sheets

28

| No | Candidate area | Guide message |
|---|---|---|
| 1 | — | Move the article closer to the glass surface |
| 2 | A | Move the article down to the right |
| 3 | B | Move the article down |
| 4 | C | Move the article down to the left |
| 5 | D | Move the article to the left |
| 6 | E | Move the article up to the left |
| 7 | F | Move the article up |
| 8 | G | Move the article up to the right |
| 9 | H | Move the article to the right |

CODE SYMBOL READING APPARATUS AND READING METHOD

CROSS-REFERENCE TO RELATED APPLICATION

This application is based upon and claims the benefit of priority from Japanese Patent Application No. 2010-030541, filed on Feb. 15, 2010; the entire contents of which are incorporated herein by reference.

FIELD

Embodiments described herein relate generally to a technique of reading a code symbol such as a barcode attached to an article, using a camera such as a charge coupled device (CCD) camera.

BACKGROUND

A technique of detecting and slicing off a barcode from image data including characters, patterns and the like is already known. Thus, using this technique, a code symbol reading apparatus is recently developed which reads a code symbol such as a barcode or two-dimensional data code attached to an article.

For example, there is a code symbol reading apparatus having a camera, an image display unit, and a decoder. The camera at least picks up an image of a code symbol and outputs the image data of the code symbol. The image display unit displays the image data outputted from the camera, in real time as a dynamic image. The decoder decodes the code symbol based on the image data outputted from the camera.

The code symbol reading apparatus can allow an operator to recognize the reading state of the code symbol. Therefore, the operator can adjust the direction and position of the code symbol so that the code symbol can be securely read.

However, an operator who is unfamiliar with the operation cannot determine the direction in which the code symbol should be moved even when viewing the dynamic image, and often takes long for the adjustment.

DETAILED DESCRIPTION

In general, according to one embodiment, a code symbol reading apparatus includes a decoder, a candidate area detection unit, a direction determination unit, and a direction notification unit. The decoder decodes a code symbol attached to an article based on an image picked up by a camera, the image include the article. The candidate area detection unit detects an image area to be a candidate of the code symbol from the image of the article picked up by the camera. The direction determination unit determines such a direction that a decoding rate of the code symbol becomes higher based on the image area detected by the candidate area detection unit when the decoder cannot decode the code symbol. The direction notification unit notifies of the direction determined by the direction determination unit.

Hereinafter, an embodiment of the code symbol reading apparatus will be described using the drawings. In this embodiment, the code symbol reading apparatus is applied to a barcode reading apparatus 8 incorporated in a self-scanning type checkout terminal 1.

Figure 1:
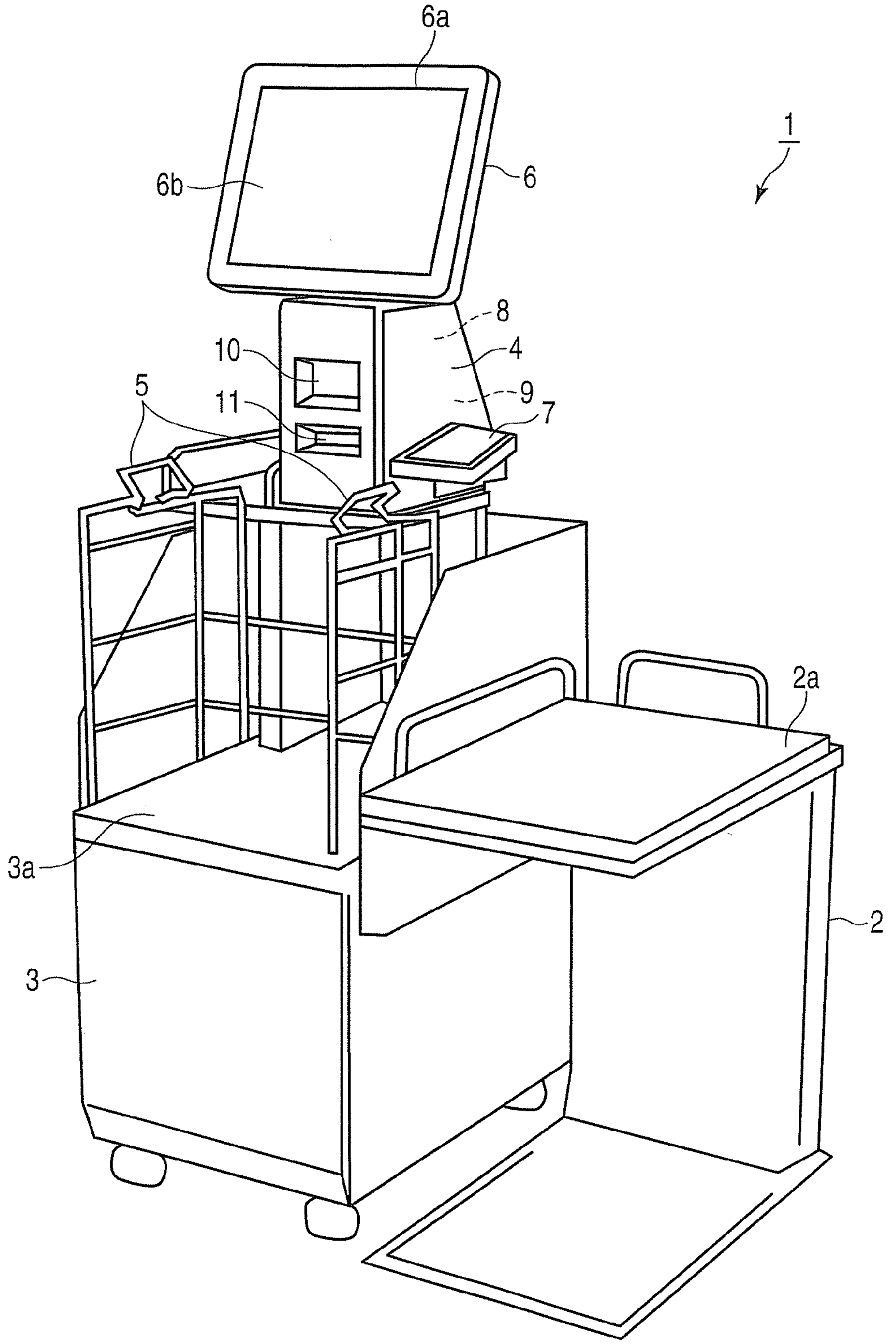
FIG. 1 is a perspective view showing the appearance of a checkout terminal as an embodiment of the invention.

FIG. 1 is a perspective view showing the appearance of the checkout terminal 1. The checkout terminal 1 has an unregistered article placing table 2, a registered article placing table 3, and a terminal body 4. The unregistered article placing table 2 has a receiving surface 2*a* on which to place an article with unregistered article information. The registered article placing table 3 has a receiving surface 3*a* on which to place an article with already registered article information. The terminal body 4 is installed above the registered article placing table 3. A pair of hook parts 5 to hook the handle parts of a shopping bag is fixed on the receiving surface 3*a* of the registered article placing table 3.

A weight measuring unit to measure the weight of an article placed on the receiving surface 2*a* is provided on the receiving surface 2*a* of the unregistered article placing table 2. A weight measuring unit to measure the weight of an article placed on the receiving surface 3*a* is also provided on the receiving surface 3*a* of the registered article placing table 3. The weight measured by these weight measuring units is used for weight check in order to prevent failure to register an article or false registration.

A display device 6 is attached on top of the terminal body 4. The display device 6 is a cathode ray tube (CRT) display, liquid crystal display, organic electro-luminescence (organic EL) display or the like. A touch panel 6*b* is arranged on a screen 6*a* of the display device 6.

An electronic settlement terminal 7 is attached to a lateral side of the terminal body 4. The electronic settlement terminal 7 carries out wireless communication with an electronic money medium and performs electronic settlement of the price in a commercial transaction.

A barcode reading apparatus 8 and a receipt printer 9 are installed inside the terminal body 4. Also, a barcode reading window 10 and a receipt issue port 11 are formed on the front side of the terminal body 4. The barcode reading apparatus 8 reads a barcode symbol attached to an article held over a glass surface of the barcode reading window 10. The receipt printer 9 prints a receipt on which the content of a commercial transaction is recorded, and issues the receipt via the receipt issue port 11.

Figure 2:
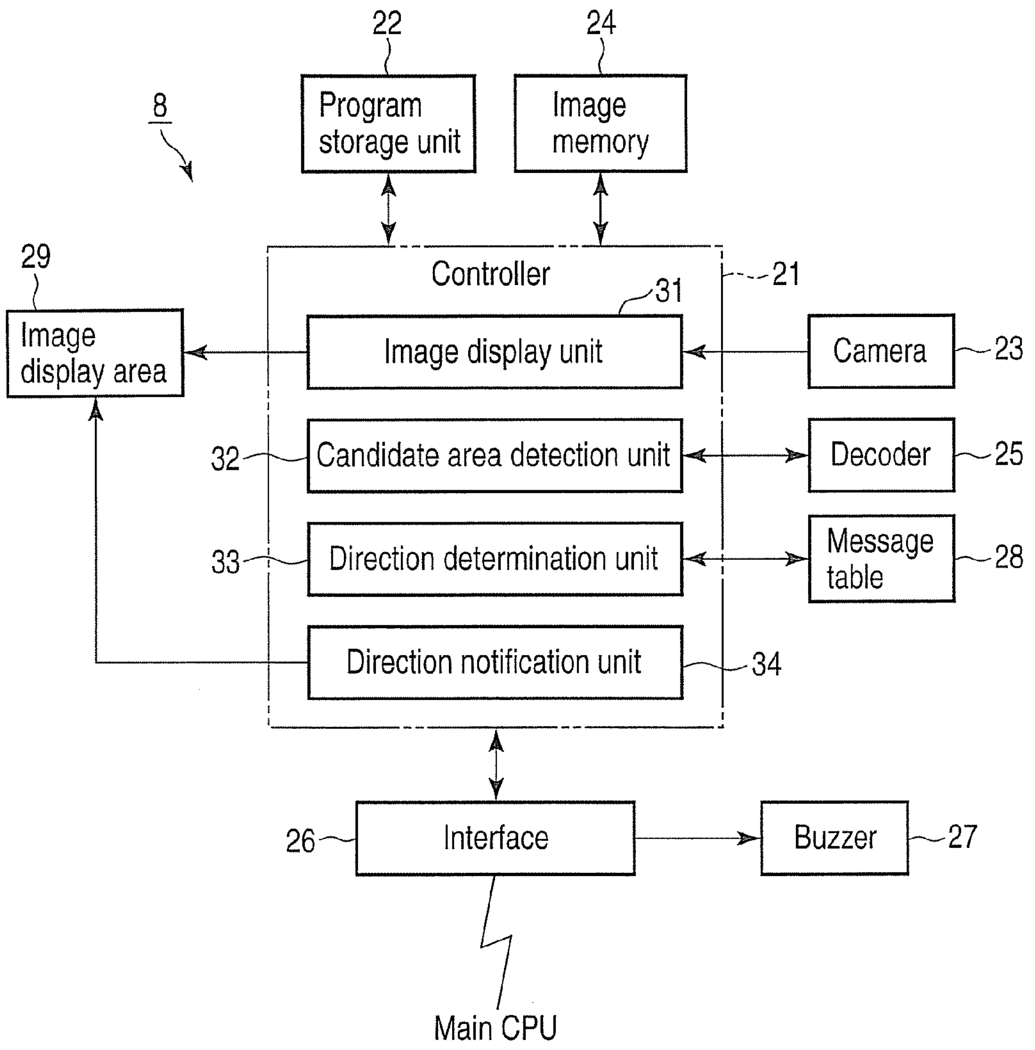
FIG. 2 is a block diagram showing the configuration of a barcode reading apparatus provided in the checkout terminal.

FIG. 2 is a block diagram showing the functional configuration of the barcode reading apparatus 8. The barcode reading apparatus 8 includes a controller 21, a program storage unit 22, a camera 23, an image memory 24, a decoder 25, an interface 26, a buzzer 27, a message table 28, and image display area 29.

The controller 21 servers as a control center of the barcode reading apparatus 8 and mainly include a central processing unit (CPU). The program storage unit 22 stores a control program to operate the controller 21.

The camera 23 includes a CCD image pickup element as an area image sensor, a driving circuit for the CCD image pickup element, and an image pickup lens to form an image in an image pickup area on the CCD image pickup element. The area of an image formed in the area of the CCD image pickup element through the image pickup lens from the barcode reading window 10 is the image pickup area. The camera 23 outputs the image in the image pickup area to the controller 21 on a frame basis. In this embodiment, a frame-based image is called a frame image.

The image memory 24 sequentially unfolds and stores the frame image outputted from the camera 23. The decoder 25 decodes barcode data, based on image data in an area sliced as a barcode candidate from the frame image unfolded in the image memory 24.

The interface 26 outputs the barcode data decoded by the decoder 25 to a main CPU of the checkout terminal 1. The buzzer 27 outputs a predetermined reading completion sound in response to the output of the barcode data via the interface 26.

The message table 28 stores data of a guide message to the operator. The image display area 29 displays the frame image picked up by the camera 23, in real time.

The controller 21 realizes the functions of an image display unit 31, a candidate area detection unit 32, a direction determination unit 33 and a direction notification unit 34 according to the control program stored in the program storage unit 22. These functions will be described with reference to the flowcharts of FIG. 3 and FIG. 4.

Figure 3:
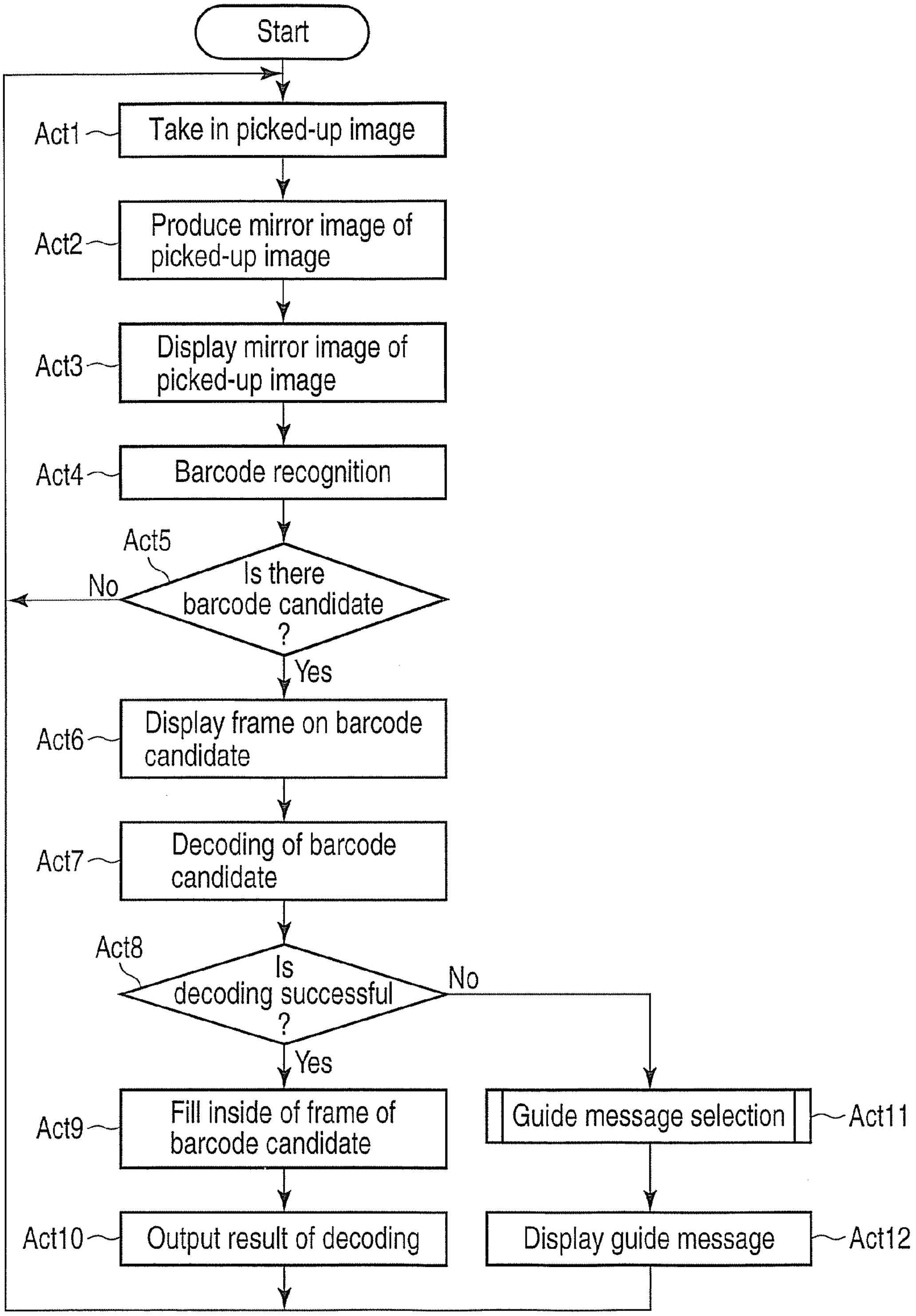
FIG. 3 is a flowchart showing processing procedures executed by a controller of the barcode reading apparatus according a control program.

As the control program is started, the controller 21 starts the processing shown in FIG. 3. First, the controller 21 takes in a frame image picked up by the camera 23 and unfolds this image in the image memory 24 (ACT 1). Next, the controller 21 produces data of a mirror image by reversing the picked up image in a left-right direction, based on the image data unfolded in the image memory 24 (ACT 2). After producing the mirror image, the controller 21 displays this mirror image in the image display area 29 (ACT 3).

Figure 7:
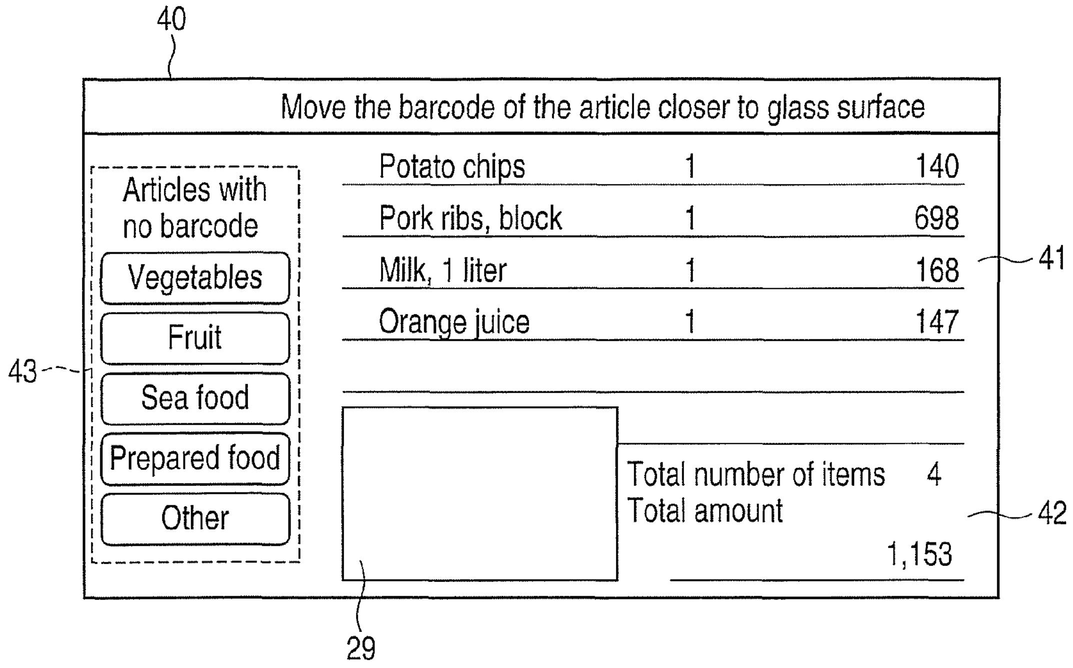
FIG. 7 is a plan view showing an example of an article registration waiting screen displayed on a display device of the checkout terminal.

The image display area 29 is formed in a part of an article registration waiting screen 40 displayed on the display device 6 of the checkout terminal 1. FIG. 7 shows an example of the article registration waiting screen 40. In the checkout terminal 1, a details display section 41 for registered articles, a total display section 42 for registered articles, and a touch button area 43 showing the categories of articles with no barcode are arranged in the article registration waiting screen 40. In the barcode reading apparatus 8, the rectangular image display area 29 is formed at a bottom-center part of the article registration waiting screen 40. That is, in the barcode reading apparatus 8, the image display area 29 is formed substantially directly above the barcode reading window 10 formed on the front side of the terminal body 4.

Here, the image display unit 31 which displays the image picked up by the camera 23 on the display device 6 is realized by each processing of ACT 1, ACT 2 and ACT 3. The image displayed by the image display unit 31 is a mirror image acquired by reversing the image picked up by the camera 23 in the left-right direction.

Next, the controller 21 analyzes the frame image stored in the image memory 24 and detects an image area that is assumed to include a barcode symbol, that is, a so-called barcode candidate image area (ACT 4). This processing uses, for example, the technique disclosed in JP-A-2005-266907 laid public in Japan.

The controller 21 determines whether a barcode candidate image area is successfully detected or not (ACT 5). When a barcode candidate image area is not successfully detected (NO in ACT 5), the controller 21 returns to the processing of ACT 1. That is, the controller 21 takes in the next frame image from the camera 23 and executes each processing of ACTs 2, 3 and 4 again.

When a barcode candidate image area is successfully detected (YES in ACT 5), the controller 21 identifies and displays the barcode candidate image area from the picked-up image displayed in the image display area 29. Specifically, the controller 21 encloses the barcode candidate image area with a frame (ACT 6).

When plural areas are simultaneously detected as barcode candidate image areas, the controller 21 decides priority of these areas as barcode candidates. The priority is decided based on a determination condition such as the proportion of the size of the barcode candidate image area to the flat area of the article, or the direction of the longitudinal side of the barcode candidate image area to the contour shape of the article. The controller 21 selects, identifies and displays the barcode candidate image area with the highest priority. That is, the controller 21 encloses the selected barcode candidate image area with a frame. Alternatively, the controller 21 encloses all the detected barcode candidate image areas with frames and changes the color of only the frame of the barcode candidate image area with the highest priority. The identification and display method is not limited to enclosing of the area with a frame.

Here, the candidate area detection unit 32 which detects an image area to be a candidate of a barcode from the image picked up by the camera 23 is realized by each processing of ACT 4, ACT 5 and ACT 6. The processing of ACT 6 can be omitted from the candidate area detection unit 32.

After identifying and displaying the barcode candidate image area, the controller 21 decodes barcode data using the decoder 25 (ACT 7). When plural areas are simultaneously detected as barcode candidate image areas, the controller 21 decodes barcode data in order from the area with the highest priority.

Generally, when a barcode symbol is held over a central part of the barcode reading window 10 at a short distance from the glass surface of the barcode reading window 10, an image of the barcode with a large size is situated at the center of an image picked up by the camera 23. Therefore, the decoder 25 can accurately decode the barcode data from the picked-up image. However, when the barcode symbol is held away from the glass surface of the barcode reading window 10, the image of the barcode is small relative to the picked-up image. When the barcode symbol is held out of the central part of the barcode reading window 10, the image of the barcode is situated at an edge of the picked-up image. Therefore, the decoder 25 may not be able to accurately decode the barcode data from the picked-up image.

The controller 21 determines whether the barcode data is successfully decoded by the decoder 25 (ACT 8). When the barcode data is successfully decoded (YES in ACT 8), the controller 21 fills the inside of the frame of the barcode candidate image area where the barcode data is successfully decoded, with a predetermined color (ACT 9). The controller 21 also outputs the barcode data decoded by the decoder 25 to the main CPU via the interface 26 (ACT 10). The main CPU performs registration of article information based on the barcode data inputted from the barcode reading apparatus 8.

Meanwhile, when the barcode data is not successfully decoded by the decoder 25 (NO in ACT 8), the controller 21 executes selection of a guide message (ACT 11). That is, the controller 21 determines such a direction that the decoding rate of the barcode becomes higher based on the current barcode candidate image area.

As described above, when the image of the barcode with a large size is situated at the center of the image picked up by the camera 23, the decoding rate of the barcode data is high. However, even if the image of the barcode is situated at the center of the picked-up image, the decoding rate of the barcode data is low if the image of the barcode is small. Moreover, when the image of the barcode is situated at an edge of the picked-up image, the decoding rate of the barcode data is low.

Thus, controller 21 determines such a direction that the decoding rate of the barcode becomes higher, based on the size of the barcode candidate image area relative to the picked-up image and the position of the barcode candidate image area in the picked-up image.

As such a direction that the decoding rate of the barcode becomes higher is determined, the controller 21 selects a guide message to guide the barcode candidate image area in that direction, from the message table 28. The controller 21 displays the selected guide message in the image display area 29 (ACT 12).

Here, the direction determination unit 33 which determines such a direction that the decoding rate of barcode data becomes higher based on the barcode candidate image area is realized by the processing of ACT 11. The direction notification unit 34 which notifies of the direction determined by the direction determination unit 33 is realized by the processing of ACT 12.

When the barcode data is outputted to the main CPU in the processing of ACT 10 or the guide message is displayed in the image display area 29 in the processing of ACT 12, the controller 21 returns to the processing of ACT 1. The controller 21 then takes in the next frame image from the camera 23 and executes the processing of ACT 2 and the subsequent processing again.

Figure 4:
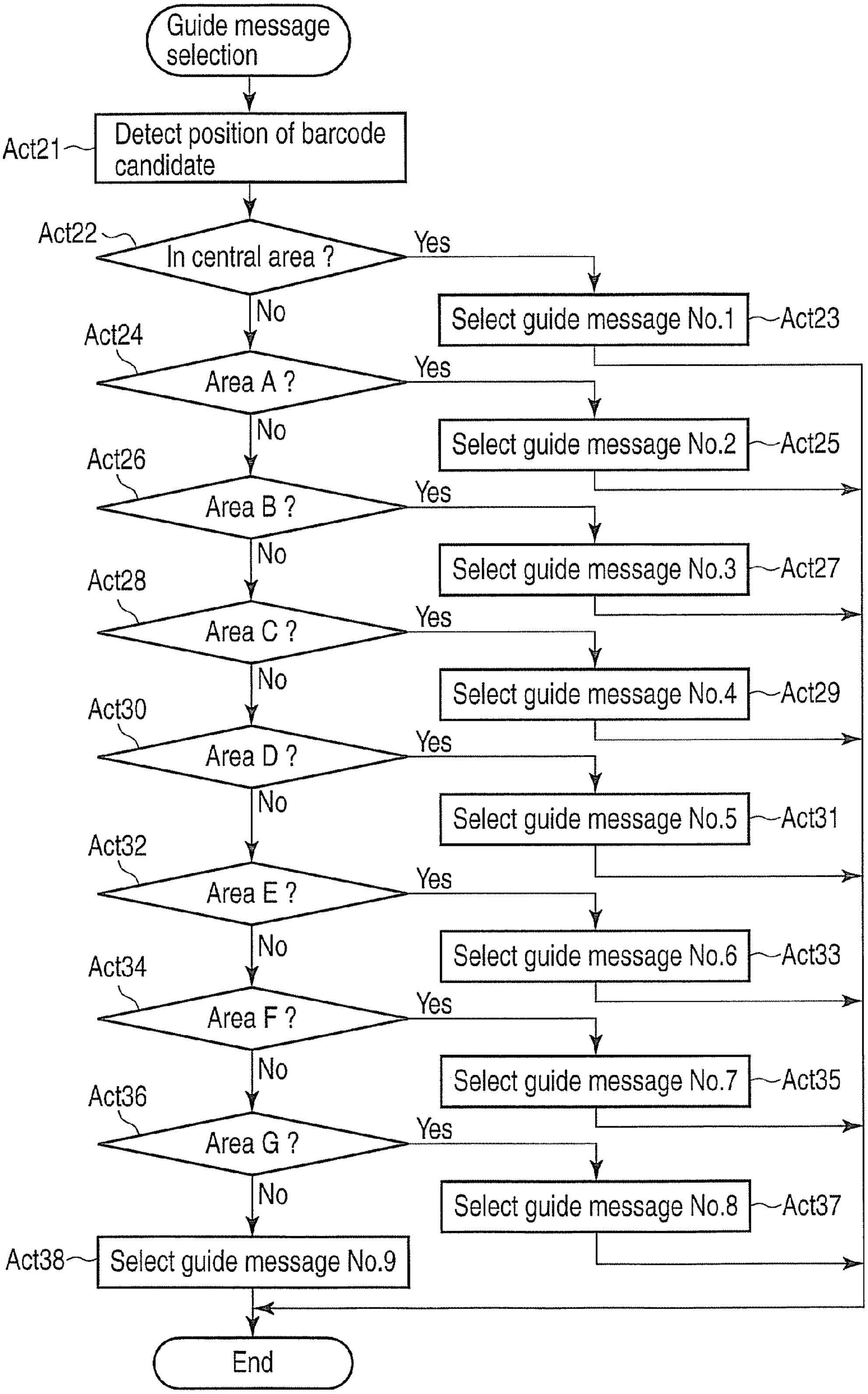
FIG. 4 is a flowchart specifically showing procedures of guide message selection in FIG. 3.

FIG. 4 is a flowchart showing specific procedures of the guide message selection (ACT 11). As the guide message selection is started, the controller 21 detects which position the barcode candidate image area exists in the picked-up image from the camera 23 (ACT 21). In this case, when there are plural barcode candidate image areas, the position of the barcode candidate image area with the highest priority is detected.

Figures 5, 6:
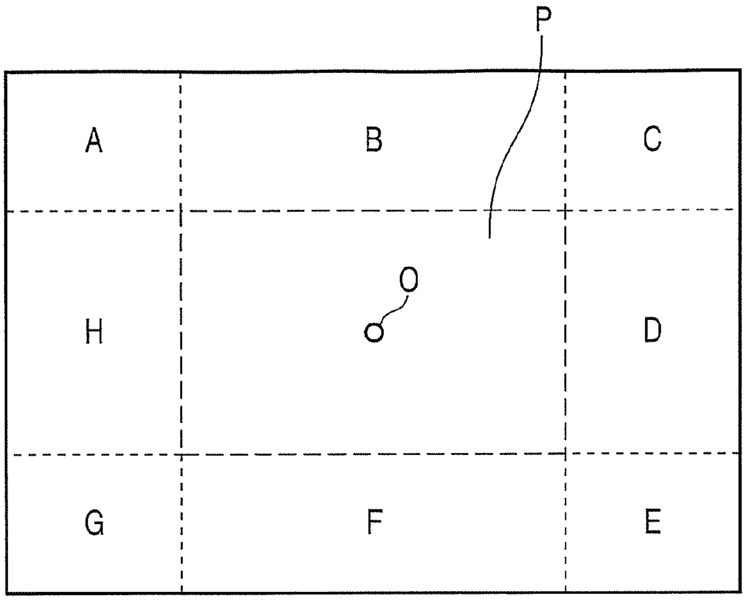
FIG. 5 schematically shows one frame of an image picked up by a camera provided in the barcode reading apparatus.
FIG. 6 shows the data configuration of a message table provided in the barcode reading apparatus.

FIG. 5 schematically shows a frame of picked-up image formed on the CCD image pickup element of the camera 23. In this embodiment, a frame of picked-up image is divided into a rectangular central area P including a center O of the frame at the center of the central area P, and a peripheral area surrounding the central area P. The peripheral area is further divided into an upper left area A, an upper area B, an upper right area C, a right area D, a lower right area E, a lower area F, a lower left area G and a left area H from the central area P.

Generally, the decoding rate of barcode data by the decoder 25 is high when a large barcode image is within the central area P. However, when the barcode image is small, the decoding rate of barcode data is lowered even if the barcode image is within the central area P. In the peripheral areas A to H, the decoding rate of barcode data is low because of the reduction in the quantity of light cast from the light source, the reduction in the quantity of lighting in the optical system including a lens, or the distortion of the image or the like. Thus, the barcode reading apparatus 8 has the message table 28 having the data content shown in FIG. 6.

That is, the message table 28 stores, as data of message number "1", a guide message "Move the article closer to the glass surface" to guide the user to move the barcode closer to the glass surface of the barcode reading window 10 in order to raise the decoding rate of the barcode candidate image. The message table 28 also stores, as data of message numbers "2" to "9", guide messages "Move the article to XX (direction)" to guide the user to move each of the barcode candidate image areas situated in the peripheral areas A to H into the central area P of the picked-up image, together with information of the peripheral areas A to H.

In the processing of ACT 21, the controller 21 detects which area of the divided areas A to H and P of the picked-up image the barcode candidate image area exists in. When the barcode candidate image area covers plural divided areas, the controller 21 detects the area with the largest area.

When the barcode candidate image area exists within the central area P (YES in ACT 22), the controller 21 selects the guide message data of message number "1" from the message table 28 (ACT 23).

Meanwhile, when the barcode candidate image area exists within peripheral areas A to H (NO in ACT 22), the controller 21 selects from the message table 28 the guide message data of message numbers "2" to "9" corresponding to the peripheral areas A to H where the barcode candidate image area exists.

That is, when the barcode candidate image area exists in the peripheral area A (YES in ACT 24), the controller 21 selects the guide message data of message number "2" (ACT 25). When the barcode candidate image area exists in the peripheral area B (YES in ACT 26), the controller 21 selects the guide message data of message number "3" (ACT 27). When the barcode candidate image area exists in the peripheral area C (YES in ACT 28), the controller 21 selects the guide message data of message number "4" (ACT 29). When the barcode candidate image area exists in the peripheral area D (YES in ACT 30), the controller 21 selects the guide message data of message number "5" (ACT 31). When the barcode candidate image area exists in the peripheral area E (YES in ACT 32), the controller 21 selects the guide message data of message number "6" (ACT 33). When the barcode candidate image area exists in the peripheral area F (YES in ACT 34), the controller 21 selects the guide message data of message number "7" (ACT 35). When the barcode candidate image area exists in the peripheral area G (YES in ACT 36), the controller 21 selects the guide message data of message number "8" (ACT 37). When the barcode candidate image area exists in the peripheral area H (NO in ACT 22 to ACT 36), the controller 21 selects the guide message data of message number "9" (ACT 38).

The one guide message thus selected is displayed in the image display area 29 by the processing of ACT 12. Then, the guide message selection ends.

The self-scanning type checkout terminal 1 having the barcode reading apparatus 8 of such configuration is installed, for example, at a checkout counter of a supermarket. A customer who carries out accounting of purchased articles using the checkout terminal 1 first places articles with unregistered article information on the receiving surface 2*a* of the unregistered article placing table 2. Next, the customer takes out the articles one by one from the receiving surface 2*a* and holds the barcode symbol attached to the articles over the barcode reading window 10.

When the barcode data is consequently read by the barcode reading apparatus 8, a reading completion sound is outputted from the buzzer 27. Also, the registration information of the articles is displayed in the details display section 41 of the article registration waiting screen 40 displayed on the display device 6. Then, the customer puts the articles which the customer holds in hand into a shopping bag spread on the receiving surface 3*a* of the registered article placing table 3.

Meanwhile, when the barcode data is not read even if the barcode symbol of the article is held over the barcode reading window 10, a mirror image of the picked-up image and a predetermined guide message are displayed in the image display area 29 of the article registration waiting screen 40.

Figure 8:
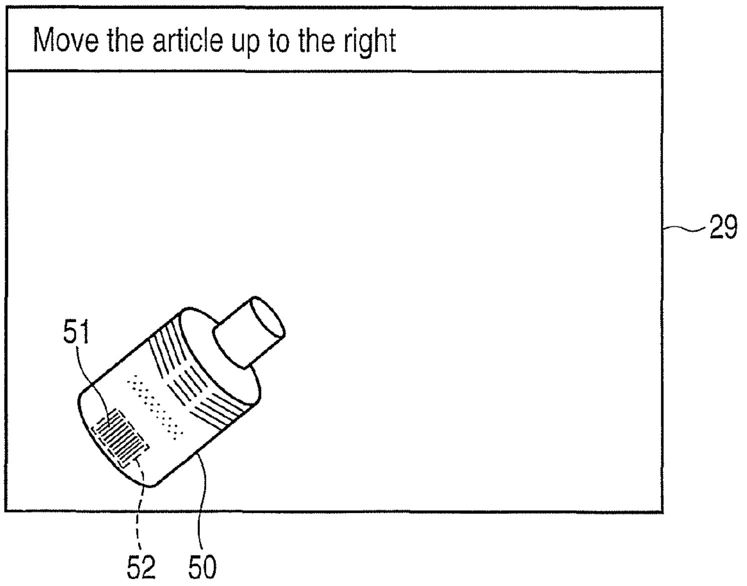
FIG. 8 is a plan view showing an exemplary display in an image display area when a barcode candidate image area is situated at a bottom-right part of a picked-up image.

FIG. 8 shows an exemplary display in the image display area 29 where a guide message is displayed. For convenience of explanation, other images than the article are omitted. The same applies to FIG. 9 and FIG. 10, which will be described later.

In the example of FIG. 8, a barcode candidate image area 52 to be a candidate of a barcode symbol 51 attached to an article 50 exists in the area G lower left from the central area P of the picked-up image. In this case, the guide message "Move the article up to the right" of message number "8" is selected from the message table 28 and is displayed in the image display area 29. Thus, according to this message, the customer moves the article 50 held over the barcode reading window 10, up to the right.

Figure 9:
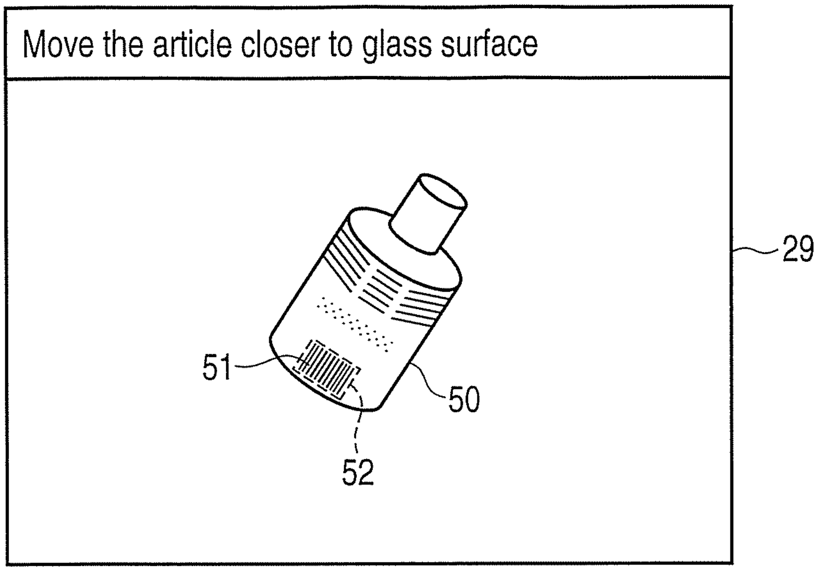
FIG. 9 is a plan view showing an exemplary display in the image display area when barcode data is not read though the barcode candidate image area is situated at the center of the picked-up image.

FIG. 9 shows an exemplary display in the image display area 29 when the article 50 is moved up to the right and thus situated in the central part of the picked-up image. In the example of FIG. 9, the barcode candidate image area 52 is situated in the central area P of the picked-up image. However, the image of the barcode symbol is small. Therefore, the decoder 25 cannot decode the barcode data. In this case, the guide message "Move the article closer to the glass surface" of message number "1" is selected from the message table 28 and displayed in the image display area 29. Thus, according to this message, the customer moves the article 50 held over the barcode reading window 10, closer to the glass surface.

Figure 10:
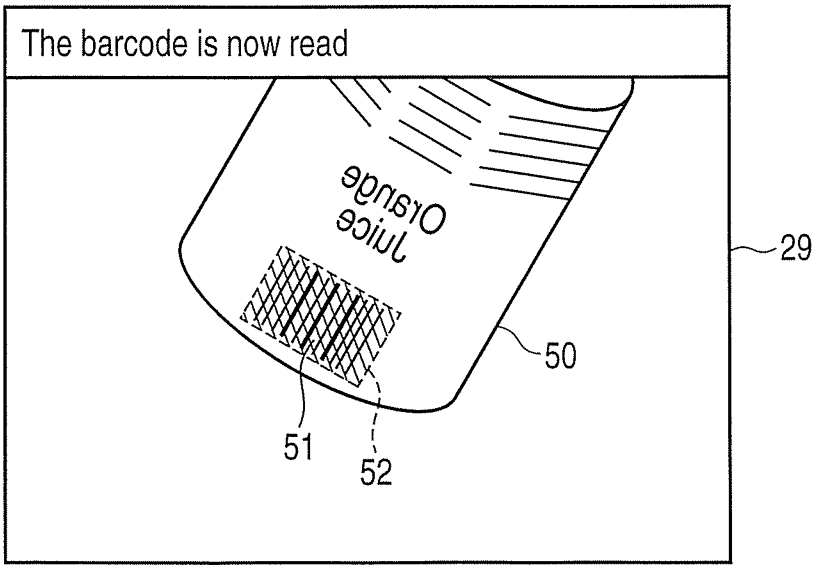
FIG. 10 is a plan view showing an exemplary display in the image display area when the barcode candidate image area is situated at the center of the picked-up image and barcode data is read.

FIG. 10 shows an exemplary display in the image display area 29 when the article 50 is moved closer to the glass surface. In the example of FIG. 10, since the article 50 is moved closer to the glass surface, the image of the barcode symbol now appears larger. Therefore, the decoder 25 can decode the barcode data. As the barcode data is decoded, the barcode candidate image area 52 is filled with a predetermined color. In the guide message section, a fixed message "The barcode is now read" is displayed.

Thus, the operator moving the article according to the guide message can recognize that the barcode data is read, as the barcode candidate image area 52 is filled with a predetermined color.

In this manner, simply by moving an article held over the barcode reading window 10 according to a guide message by the operator, the data of the barcode symbol attached to the article is securely read. Therefore, even when the operator is a customer who is unfamiliar with the operation of the self-scanning type checkout terminal 1, the operator can adjust the direction and position of the barcode symbol in a short time so that the barcode data can be securely read.

Moreover, a guide message is displayed on the display device 6 together with a picked-up image in the form of a mirror image in the image display area 29 provided substantially immediately above the barcode reading window 10. Therefore, the operation is easy since it suffices for the operator to move the article toward the center of the image display area 29 while viewing the picked-up image displayed in the image display area 29. Thus, the time required for reading the barcode data can be reduced and processing efficiency can be improved. Moreover, stress on the operator can be reduced, too.

The invention is not limited to the embodiment. In practical implementations, components can be embodied in modified manners without departing from the scope of the invention.

In the embodiment, the direction notification unit 34 displays a guide message and thereby notifies of such the direction that the decoding rate of the code symbol becomes higher based on an image area detected by the candidate area detection unit. However, the direction notification unit 34 is not limited to this example. For example, the direction notification unit 34 may notify of a guide message via an audio guide using a voice synthesizer. In this case, the image display unit 31 which displays an image picked up by the camera 23 on the display device 6 is not necessarily required.

In the embodiment, the invention is applied to the barcode reading apparatus 8 in the self-scanning type checkout terminal 1. However, the application target of the invention is not limited to this example. The invention can also be applied to a reading apparatus for other code symbols than barcodes, for example, two-dimensional data codes.

Moreover, in the embodiment, it is assumed that the control program to realize the functions of the invention is recorded in advance in the program storage unit 22 within the apparatus. However, without being limited to this example, a similar program may be downloaded to the apparatus from a network. Alternatively, a similar program recorded in a recording medium may be installed in the apparatus. The recording medium may be of any form as long as the recording medium can store a program and can be read by the apparatus, like CD-ROM. The functions that can be acquired by installation or download of the program may also be realized in cooperation with the operating system (OS) within the apparatus or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A code symbol reading apparatus comprising:

a decoder which decodes a code symbol attached to an article based on an image picked up by a camera, the image include the article;

an image display unit which displays a mirror image acquired by reversing the image picked up by the camera in a left-right direction, in a display area;

a candidate area detection unit which detects an image area to be a candidate of the code symbol from the image of the article picked up by the camera;

a direction determination unit which determines such a direction that a decoding rate of the code symbol becomes higher based on the image area detected by the candidate area detection unit when the decoder cannot decode the code symbol; and a direction notification unit which notifies of the direction determined by the direction determination unit.

2. The apparatus of claim 1, wherein the direction determination unit specifies such a direction that the image area detected by the candidate area detection unit becomes larger, as such the direction that the decoding rate of the code symbol becomes higher.

3. The apparatus of claim 1, wherein the direction determination unit specifies such a direction that the image area detected by the candidate area detection unit becomes closer to the center of the image picked up by the camera, as such the direction that the decoding rate of the code symbol becomes higher.

4. The apparatus of claim 1, wherein when the image area to be the candidate of the code symbol is detected by the candidate area detection unit, the image display unit identifies and displays this image area on the image picked up by the camera in the display area.

5. The apparatus of claim 4, wherein the direction determination unit specifies such a direction that the image area identified and displayed in the display area becomes larger, as such the direction that the decoding rate of the code symbol becomes higher.

6. The apparatus of claim 4, wherein the direction determination unit specifies such a direction that the image area identified and displayed in the display area becomes closer to the center of the image picked up by the camera, as such the direction that the decoding rate of the code symbol becomes higher.

7. The apparatus of claim 4, wherein the direction notification unit displays a guide message notifying of the direction determined by the direction determination unit, in the display area.

8. The apparatus of claim 1, wherein the direction determination unit specifies such a direction that the image area identified and displayed in the display area becomes closer to the center of the image picked up by the camera, as such the direction that the decoding rate of the code symbol becomes higher.

9. The apparatus of claim 1, wherein when plural image areas are detected by the candidate area detection unit, the image display unit selects one of the image areas and identifies and displays the selected image area on the image picked up by the camera, and the direction determination unit specifies such a direction that the image area selected from the plural image areas becomes larger, as such the direction that the decoding rate of the code symbol becomes higher.

10. The apparatus of claim 1, wherein when plural image areas are detected by the candidate area detection unit, the image display unit selects one of the image areas and identifies and displays the selected image area on the image picked up by the camera, and the direction determination unit specifies such a direction that the image area selected from the plural image areas becomes closer to the center of the image picked up by the camera, as such the direction that the decoding rate of the code symbol becomes higher.

11. A code symbol reading method comprising:

decoding, based on an image of an article picked up by a camera, a code symbol attached to the article;

displaying a mirror image acquired by reversing the image picked up by the camera in a left-right direction, in a display area;

detecting an image area to be a candidate of the code symbol from the image of the article picked up by the camera;

determining such a direction that a decoding rate of the code symbol becomes higher based on the image area detected by the candidate area detection unit when the decoder cannot decode the code symbol; and notifying of the determined direction.

* * * * *